(12) United States Patent
Giraud et al.

(10) Patent No.: US 8,545,155 B2
(45) Date of Patent: Oct. 1, 2013

(54) ATTACHMENT FASTENER WITH A SEALING WASHER

(75) Inventors: Sylvain Giraud, Echirolles (FR); Steve Mouchet, Chapareillan (FR)

(73) Assignee: A. Raymond et Cie, Grenoble (FR)

( * ) Notice: Subject to any disclaimer, the term of this patent is extended or adjusted under 35 U.S.C. 154(b) by 301 days.

(21) Appl. No.: 13/125,484

(22) PCT Filed: Oct. 8, 2009

(86) PCT No.: PCT/EP2009/007210
§ 371 (c)(1),
(2), (4) Date: May 12, 2011

(87) PCT Pub. No.: WO2010/051896
PCT Pub. Date: May 14, 2010

(65) Prior Publication Data
US 2011/0211933 A1 Sep. 1, 2011

(30) Foreign Application Priority Data
Nov. 7, 2008 (FR) ...................................... 08 57573

(51) Int. Cl.
*F16B 43/00* (2006.01)
(52) U.S. Cl.
USPC ....................................... 411/371.2; 411/542
(58) Field of Classification Search
USPC .............................. 411/369, 371.1, 371.2, 542
See application file for complete search history.

(56) References Cited

U.S. PATENT DOCUMENTS

| 5,173,026 | A | * | 12/1992 | Cordola et al. | 411/508 |
| 5,846,040 | A | * | 12/1998 | Ueno | 411/45 |
| 6,264,393 | B1 | * | 7/2001 | Kraus | 403/282 |
| 7,033,121 | B2 | * | 4/2006 | Kirchen | 411/48 |
| 7,862,275 | B2 | * | 1/2011 | Jatzke | 411/45 |
| 2002/0028123 | A1 | * | 3/2002 | Miura et al. | 411/508 |
| 2006/0099051 | A1 | | 5/2006 | Moerke | |

FOREIGN PATENT DOCUMENTS

DE 202006011702U1 U1 10/2006
EP 1895171A2 A2 3/2008

OTHER PUBLICATIONS

Written Opinion and International Search Report mailed Dec. 21, 2009 in International Application No. PCT/EP2009/007210.

* cited by examiner

*Primary Examiner* — Robert A Delisle
(74) *Attorney, Agent, or Firm* — Faegre Baker Daniels LLP

(57) ABSTRACT

The invention relates to an attachment fastener that comprises a body (1) extending in an axial direction, with a head (2), a leg (3) and a skirt-shaped flexible collar (4) provided between the head (2) and the leg (3), and annular sealing washer (5) for sealing the length of a peripheral edge (42) of the collar (4), said sealing washer (5) having a lower surface (57) directed towards the opposite side of the collar (4) having at least one annular bead defining a first sealing line on the lower surface (57) of the washer (5). The sealing washer (5) is adapted to be removably attached onto said peripheral edge (32) of the collar (4), and comprises an upper surface opposite the lower surface (57), which defines an annular shoulder protruding on the side of the collar (4) and on which bears said peripheral edge (42) of the collar (4), said annular shoulder defining another sealing line on the upper surface of the washer (5).

18 Claims, 2 Drawing Sheets

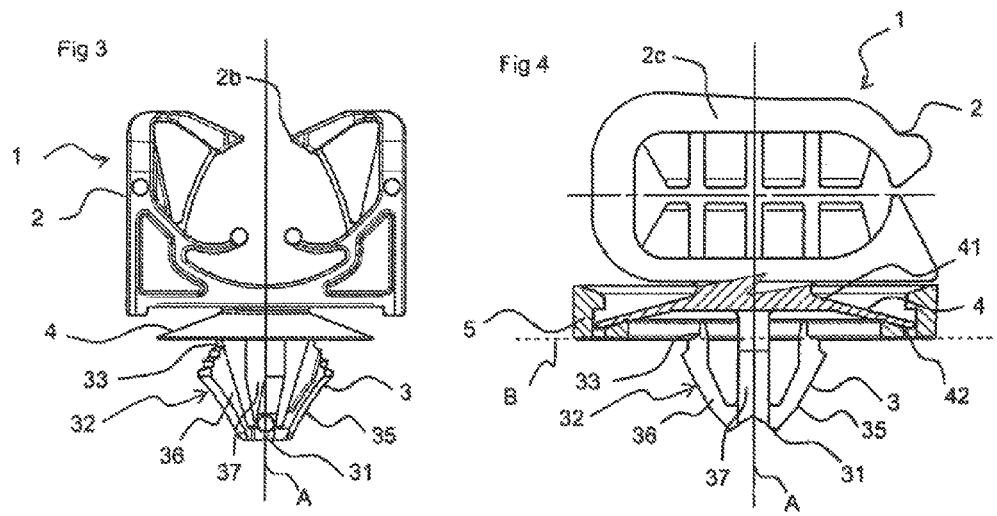
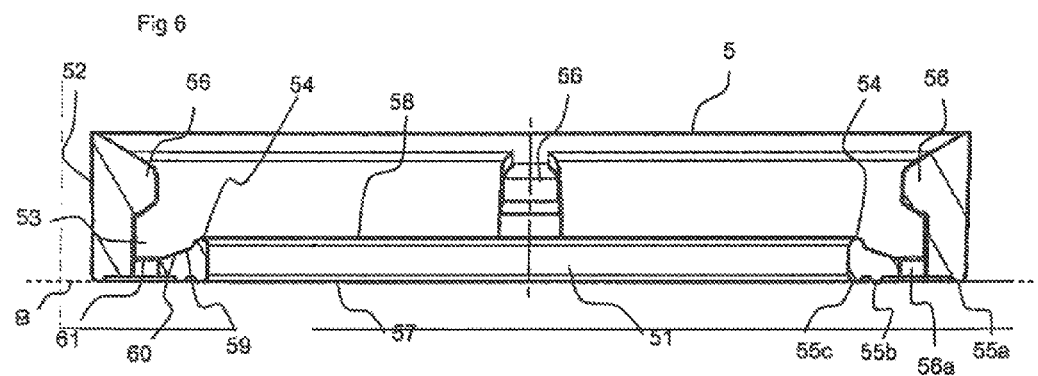
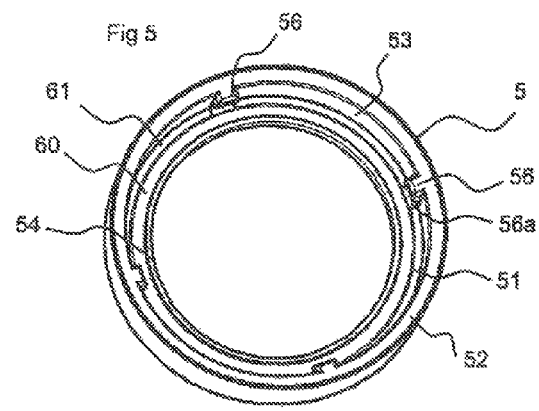

ATTACHMENT FASTENER WITH A SEALING WASHER

CROSS-REFERENCE TO RELATED APPLICATION

This application is a U.S. National Phase Patent Application based on International Application Serial No. PCT/EP2009/007210 filed Oct. 8, 2009, the disclosure of which is hereby explicitly incorporated by reference herein.

BACKGROUND OF THE INVENTION

1. Field of the Invention

The present invention relates to an attachment fastener.

2. Description of the Related Art

A wide variety of attachment fasteners are currently used for mounting an element, for instance a panel, a tube or cables on a support, such as a plate or the door of a machine or a motorized land vehicle, while ensuring a sealed mounting. The mounting takes place by inserting the attachment fastener through two orifices drilled respectively in the panel and the support. These orifices represent also openings through which elements can be introduced which are undesirable for proper functioning of the machine. These undesirable elements can be for instance dust or, which is a bigger problem, water or any other liquid. Indeed, the presence of water in mechanisms or machines can lead to phenomena of corrosion and premature wear, electrical connectivity problems, etc.

Patent EP-1895171 discloses such an attachment fastener equipped with a head suitable to be mounted on a panel through an orifice of the panel, a leg suitable to be mounted on the support through an orifice of the support, a collar arranged at the junction of the leg and the head, and a sealing washer made of relatively soft plastic material moulded on the periphery of the collar to ensure sealing with the support. The washer is formed in such manner as to have two peripheral lips on its lower side, the internal lip extends axially from the lower side of the washer over a distance smaller than that of the external lip, in order to accommodate different support thicknesses between the leg and the head of the attachment fastener. This type of attachment fastener raises a problem due to the chemical or mechanical interaction between the washer and the attachment fastener which must be controlled very often during the industrial fabrication of the fastener.

Patent US-2006099051 describes another attachment fastener, similar to the one described above, in which the washer is made of supple material and added to the collar. The washer is of simple form with a fine and unique contact point with the support.

SUMMARY OF THE INVENTION

The goal of the invention is to strengthen even more the sealing action provided by the washer of an attachment fastener such as defined above and in particular the sealing action against fluids.

To this end, an attachment fastener is disclosed, comprising a body extending in an axial direction with a head, a leg and a flexible skirt-shaped collar located between the head and the leg, and an annular sealing washer intended to ensure sealing along a peripheral edge of the collar, this sealing washer has an interior face directed towards the opposite side of the collar which has at least one annular lip or bead forming at least a first sealing line on the lower face of the washer, characterized in that said sealing washer is designed to be mounted in removable manner on said peripheral edge of the collar and comprises an upper face opposite said lower face forming an annular shoulder protruding from the collar side and on which rests said peripheral edge of the collar, this annular shoulder forms another sealing line on the upper surface of the washer.

Such an arrangement guarantees good sealing action against fluids. In addition, the fabrication of the body of the attachment fastener and of the associated sealing washer is simple and does not require special tooling, such as a two-material mould with a rigid material for the body of the fastener and a supple material for the sealing washer, which reduces the total fabrication cost of the attachment fastener.

A specific advantage of the sealing washer according to the invention is that it combines two compression effects, the compression of the flexible collar against the upper face of the washer and the compression of the beads on the washer against the support, resulting in a perfect seal between the attachment fastener and the support. The deformable collar provides good adhesion and constant force against the upper face of the washer, all around the periphery of the washer. The two concentric annular beads of the sealing washer constitute two sealing lines, trapping fluids which could otherwise seep between the support and the washer.

The fastener according to the invention is particularly suitable, but not exclusively, for mounting an element on a support. In mounted position, the head of the fastener is attached to said element, and the washer is enclosed between the collar and the support, while the cooperation of the deformable collar, in general shaped like a truncated cone, and the washer confers excellent sealing action to the assembly. Furthermore, this sealing solution is adaptable to all types of attachment fasteners possessing a deformable element or collar.

The attachment fastener according to the invention can have the following characteristics:

- said upper face of the sealing washer is formed with an annular groove in which said peripheral edge of the collar is inserted, said annular shoulder is formed by a peripheral edge of said groove;
- said peripheral edge of said groove is defined by a wall in the form of a truncated cone with circular or oblong base, prolonged by an annular bead protruding relative to said wall in the form of a truncated cone;
- said annular bead that protrudes relative to the wall in the form of a truncated cone has a rounded surface;
- said sealing washer has an external peripheral edge which defines positional blocking notches for the collar;
- the sealing washer has a lower surface which extends essentially in a plane perpendicular to said axial direction;
- the annular groove has a bottom which is positioned in axial projection between two annular concentric lips or beads of the lower face of the sealing washer;
- the body of the fastener, the collar and the sealing washer have respectively a circular section;
- the body of the fastener, the collar and the sealing washer have respectively an oblong section;
- the body is made by moulding of a first plastic material, the sealing washer is made by moulding of a second plastic material, more supple than the first plastic material; and
- the second plastic material constituting the sealing washer is an elastomer.

The invention applies to an attachment fastener, with a head which is attached by means of a clip, a notched strip, tape, or in any other way, for mounting electrical cables, tubes or other elements to be mounted on a support provided with an orifice.

In one form thereof, the present invention provides an attachment fastener, including a body extending in axial direction (A) with a head, a leg and a flexible skirt-shaped collar located between the head and the leg, and an annular sealing ring intended to guarantee sealing along a peripheral edge of the collar, the sealing washer has a lower face directed towards the opposite side of the collar with at least one annular lip or bead forming at least one first sealing line on the lower face of washer, characterized in that the sealing washer is designed to be mounted in removable manner on the peripheral edge of the collar and includes an upper face opposite to the lower face forming an annular shoulder which protrudes from the side of the collar and on which rests the peripheral edge of the collar, this annular shoulder forms another sealing line on the upper face of the washer.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3 is a front view of another attachment fastener without sealing washer;

FIG. 4 is a front view in partial longitudinal section of another attachment fastener with sealing washer;

FIG. 5 is an isometric view of a sealing washer for attachment fastener; and

FIG. 6 is a view in longitudinal section of the sealing washer of FIG. 5.

Figure 1:
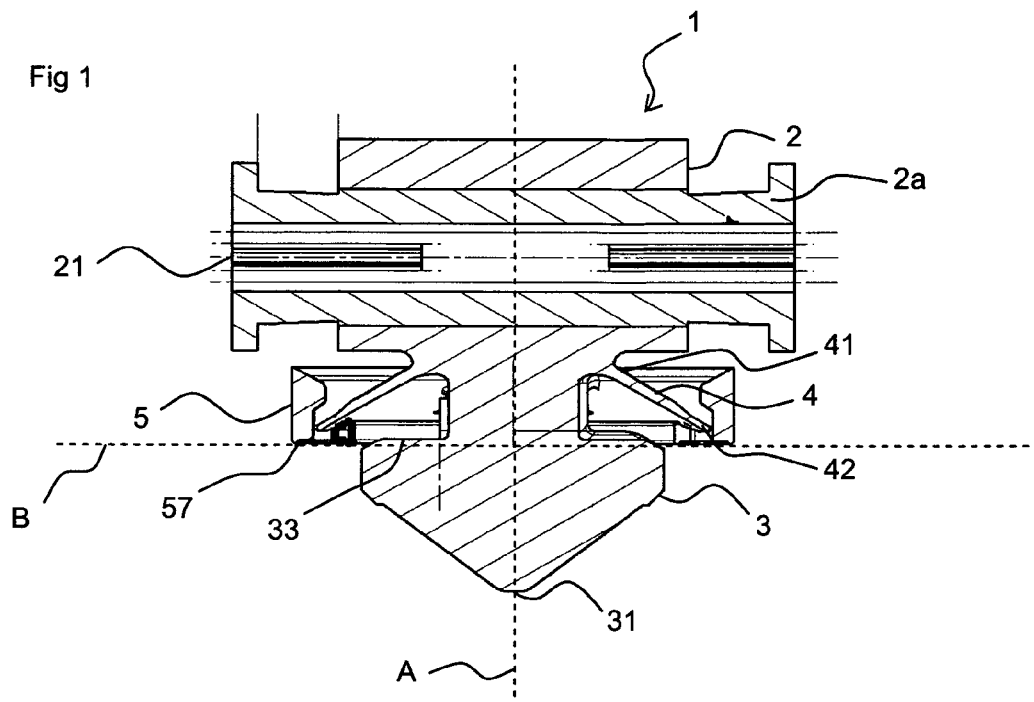
FIG. 1 is a longitudinal section along line I-I of FIG. 2 of an attachment fastener according to the invention with a sealing washer.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 shows a fastener used for mounting an element (not shown) on a plate type support (not shown), comprising a body 1 made of a first relatively rigid moulded plastic material extending along an axial direction A; body 1 is equipped with a head 2, a leg 3 and a skirt-shaped flexible collar 4 located between head 2 and leg 3. This first plastic material is selected so that collar 4 is flexible and deformable while at the same time body 1 is rigid, for instance a thermoplastic material, for instance a polyamide type material, injectable in an injection mould.

The attachment fastener comprises also a removable annular sealing washer 5, intended to ensure sealing along a peripheral edge 42 of collar 4. The sealing washer 5 is made of a second relatively supple plastic material, in other words, much softer than the first plastic material constituting body 1 of the fastener, for instance, an elastomer injectable in an injection mould or any other material that is supple relative to the first plastic material, for instance a rubber type material.

Figure 2:
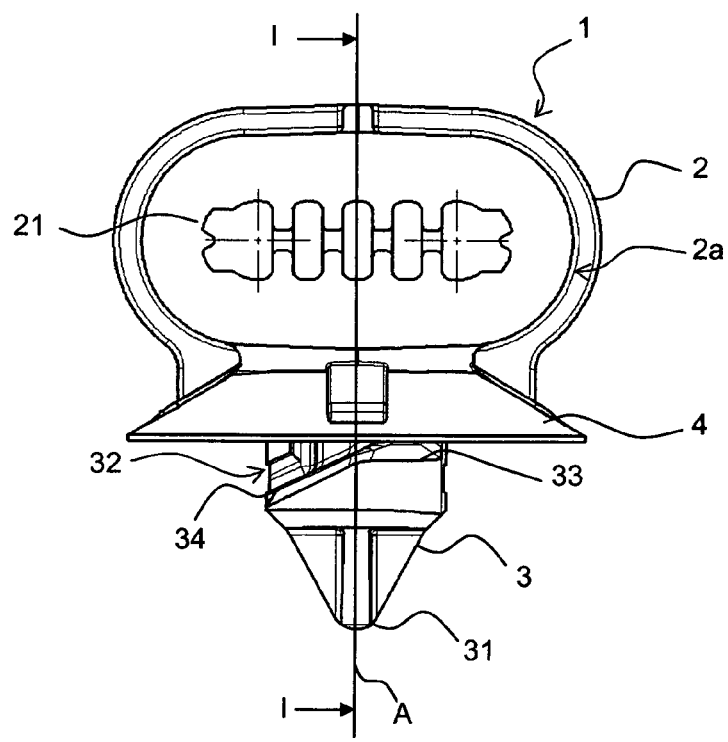
FIG. 2 is a front view of the attachment fastener of FIG. 1 without the sealing washer.

The head 2 of the attachment fastener forms a device 2a for mounting an element to the fastener, as shown in FIGS. 1 and 2, this attachment device 2a is shown here in a first implementation mode in the form of a pin 21 that can slide in transversal direction and is intended to receive a screw (not shown) for mounting said element on the attachment fastener. The pin 21 can be designed to receive a screw for supple or soft material suitable for tapping threads in pin 21 when it is screwed in head 2.

It is understood that other implementation modes of head 2 of the attachment fastener according to the invention can be envisaged for mounting various types of elements to the fastener with the appropriate mounting device. For instance, head 2 can also be equipped with a lyre-shaped tube support 2b such as shown on FIG. 3, or an electrical connector mounting device 2c shown on FIG. 4, or a tie wrap (not shown).

Leg 3 forms a system 32 for attaching the fastener on its support and is equipped with a location surface 33 on which one face of the support rests in order to compress collar 4 against the other face of the support and to create a seal, against dust in particular. The location surface 33 and the attachment system 32 can have a form that varies depending on the use of the attachment fastener.

For instance, in the implementation mode of the attachment fastener shown in FIGS. 1 and 2, leg 3 is equipped with an attachment system 32 called "quarter turn system" comprising at least one inclined slope 34 suitable for guiding the support up to the location surface 33. In this case, leg 3 is composed of a central core with rectangular section and with a cone shaped extremity 31 intended to facilitate the insertion of leg 3 in an oblong shaped orifice of the support.

To mount leg 3 on the support, leg 3 is inserted in the orifice of the support and leg 3 is turned one fourth of a turn. The slopes 34 guide the support to the location surface 33 of leg 3 and assist in this way in compressing collar 4 against the support. This quarter turn rotation causes significant crushing of collar 4 over its whole periphery when it comes in contact with the support.

It is understood that other implementation modes of leg 3 of the attachment fastener according to the invention can be envisaged with various attachment systems 32. As shown on FIGS. 3 and 4, leg 3 can be designed in the shape of an anchor 35 comprising a central core 37 and two elastically deformable legs 36 forming a location surface 33 with several levels, on which a relatively high force is exercised to compress collar 4 against the support.

Collar 4 is shown in the form of a skirt with the shape of a truncated cone protruding from an edge 41 of collar 4 connected to body 1 of the fastener and flaring or becoming larger towards it free peripheral edge 42 in direction of leg 3 of the fastener. The thickness of the truncated cone shaped wall 4 is greater at its edge 41 connected to the fastener than at its peripheral edge 42, giving collar 4 suppleness and flexibility to deform thanks to its own geometry or mechanical characteristics, in order to improve the contact with washer 5. In this way, the collar 4 guarantees good sealing action against dust. The collar 4 can have a circular or oblong section adapted to body 1 of the attachment fastener, depending on the application of the attachment fastener.

As clearly shown on FIG. 5, the sealing washer 5 forms a ring with an annular wall 51, with circular or oblong section, complementary to the form of collar 4, which is inserted or clipped in the peripheral edge 42 of collar 4, by slipping it over leg 3.

A lower face 57 of the annular wall 51, directed towards the opposite side of collar 4, is intended to locate against the support and is equipped here with three concentric annular lips or beads 55a, 55b, 55c, of which the respective free extremities are located in the same radial plane B perpendicular to direction A, as is better visible on FIG. 6, in order to form three concentric sealing lines. A first bead 55a is here disposed on the external periphery of the lower face 57 of the sealing washer 5 in order to create a first contact line or sealing line between the support and washer 5. A second bead 55c, the farthest away from the first bead 55a, is located on the internal periphery of the lower face 57 of annular wall 51 in order to create a second sealing line between the support and washer 5. A third bead 55b is located between the first and the second beads 55a, 55c and forms a third sealing line between the support and washer 5. The three beads 55a, 55b, 55c form in this manner two damming zones between the support and washer 5 and constitute an effective sealing barrier against all sorts of fluids, in particular fluids under pressure.

An upper face 58 of the annular wall 51, opposite the lower face 57, is formed in such way as to create a groove 53 in which the peripheral edge 42 of collar 4 is housed and as can be seen on FIG. 6, the upper face 58 of wall 51 forms an annular shoulder 54 protruding from the side of collar 4, on which the peripheral edge 42 of collar 4 rests in order to form a fourth concentric sealing line.

More precisely, as shown on FIG. 6, the upper face 58 of wall 51 comprises a peripheral edge 59 defined by the wall 60 of a truncated cone inclined upward in direction of the center of washer 5, with circular or oblong base, which is prolonged by the annular shoulder or bead 54 which protrudes relative to the wall 60 of the truncated cone, so that the upper face 58 complies to the shape of the peripheral edge 42 of collar 4.

It is understood that prior to installing the attachment fastener between an element and a support, the annular shoulder 54 and the upper face 58 are not in direct or close contact with collar 4, but the compression of washer 5 between the support and the attachment fastener provokes crushing and deformation of collar 4 against the inclined upper face 58 and the annular shoulder 54 guarantees in this way very good contact between the peripheral edge 42 of collar 4 and washer 5, and therefore very good sealing action against fluids.

The annular groove 53 has a bottom 61 which by preference is positioned in axial projection between the two annular beads 55a, 55c, which are farthest away from each other on the lower surface 57 of the sealing washer 5, providing stable support for the peripheral edge 42 of collar 4 against bottom 61.

The annular beads 55a, 55b, 55c and shoulder 54 have here a slightly rounded surface, but it is understood that they can have any other form, for instance a triangular form.

As shown on FIG. 6, the radial section of washer 5 is full and has a certain rigidity due to its geometric form which, combined with the suppleness of the material used to make washer 5, confers to washer 5 proper firmness and good resistance to friction and if necessary to shearing when washer 5 is inserted between the attachment fastener and the support.

The sealing washer 5 is held on collar 4 through the intermediary of at least two mounting notches 56 which block collar 4 in position, here 4 notches 56 arranged symmetrically along a continuous peripheral edge 52 of washer 5. Notches 56 can also be arranged for instance on peripheral bosses (not shown) formed on the upper surface 58 of washer 5; the peripheral edge 52 of washer 5 is in this case not continuous all around the periphery of washer 5 but formed by these bosses.

In the implementation example of the sealing washer 5 shown on FIGS. 5 and 6, the section of the sealing washer 5, is L shaped with the annular radial wall 51 forming a branch of the L extending in plane B perpendicularly to direction A when washer 5 is slipped on the attachment fastener and the peripheral edge 52 of washer 5 forms the other branch of the L, the peripheral edge 52 is perpendicular to wall 51 and extends in direction A when washer 5 is slipped on the attachment fastener. Wall 51 and the peripheral edge 52 of washer 5 define here at their intersection annular groove 53 in which peripheral edge 42 of collar 4 is inserted and edge 52 provides firmness and rigidity to the washer.

Thanks to notches 56, washer 5 cannot detach from the attachment fastener during the time that the attachment fastener is mounted at the production site and the time the operator installs the sealed attachment fastener on the assembly site. Notches 56 possess some flexibility due to the first plastic material constituting body 1 of the attachment fastener, in the same manner as collar 4 and the insertion slope on the top are intended to facilitate the insertion of washer 5 on collar 4. To be noted that, if notches 56 are fabricated together with the washer 5 by injection moulding, notches 56 are then formed above the respective orifices 56a made in the bottom 61 of wall 51 of washer 5 to facilitate the removal from the mould of washer 5. Notches 56 are arranged between the two annular beads 55a, 55b, so that, in case an undesirable element is introduced in washer 5 through one of these orifices 56a, it is trapped in a holding zone between two sealing lines created by the annular beads 55a, 55b, 55c.

To install in sealing manner an attachment fastener according to the invention on a plate type support with two parallel faces, washer 5 is installed on collar 4 of the attachment fastener, leg 3 of the fastener is inserted in an orifice of the support until the location surface 33 of leg 3 rests against a face of the support, while the other face of the support locates against the lower surface 57 of washer 5. The support will then press washer 5 against collar 4 and the peripheral wall of collar 4 will deform slightly and locate in sealing manner against shoulder 54 of the washer, while the beads 55a, 55b, 55c of the washer locate in sealing manner against the support.

In the implementation mode shown on FIG. 6, the annular wall 51 of the sealing washer has an outside diameter of approximately 23 mm and an inside diameter of approximately 16 mm, the thickness of the peripheral edge 52 of washer 5 is approximately 2.5 mm and varies according to the type of attachment fastener and collar 4. In the axial direction A, the height of the peripheral edge 52 of washer 5 is approximately 3.4 mm and the thickness of the annular wall 51 is approximately 1.2 mm. The beads 55a, 55b, 55c have a height of approximately 0.15 mm, in other words they extend beyond the lower surface 57 of wall 51 by this amount; this value varies according to the plastic material of washer 5 and the application of the attachment fastener. The upper face 58 of the wall 51 is inclined upwards approximately 20° and the inclination angle is adapted to the shape of collar 4.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An attachment fastener, comprising:
    a body extending in axial direction and including a head, a leg, and a flexible skirt-shaped collar located between said head and said leg, said collar having a peripheral edge; and
    an annular sealing washer for providing a seal along said peripheral edge of said collar, said sealing washer having a lower face including at least one annular lip forming at least one first sealing line on said lower face of said sealing washer, said sealing washer including an outer peripheral wall substantially radially surrounding an outer periphery of said collar, said sealing washer further including an interiorly facing annular groove within which said peripheral edge of said collar is received, said annular groove forming an annular shoulder engageable with said peripheral edge of said collar, said annular shoulder forming a second sealing line on said sealing washer.

2. The attachment fastener of claim 1, wherein said peripheral edge of said groove is defined by a wall in the form of a truncated cone.

3. The attachment fastener of claim 2, wherein said wall includes an annular bead having a rounded surface.

4. The attachment fastener of claim 1, wherein said sealing washer includes an external peripheral edge defining positional blocking notches for said collar.

5. The attachment fastener of claim 1, wherein said sealing washer includes a lower face extending substantially in a plane perpendicular to said axial direction.

6. The attachment fastener of claim 1, wherein said body, said collar, and said sealing washer are each circular in cross-section.

7. The attachment fastener of claim 1, wherein said body, said collar, and said sealing washer each have an oblong shape.

8. The attachment fastener of claim 1, wherein said body is made of a first plastic material, and said sealing washer is made of a second plastic material which is softer than said first plastic material.

9. The attachment fastener of claim 8, wherein said second plastic material is an elastomer.

10. An attachment fastener, comprising:
a body extending in axial direction and including a head, a leg, and a flexible skirt-shaped collar located between said head and said leg, said collar having a peripheral edge; and
an annular sealing washer for providing a seal along said peripheral edge of said collar, said sealing washer having a lower face including at least one annular lip forming at least one first sealing line on said lower face of said sealing washer, said sealing washer removably mounted on said peripheral edge of said collar and further including an upper face opposite said lower face, said upper face forming an annular shoulder engageable with said peripheral edge of said collar, said annular shoulder forming a second sealing line on said upper face of said sealing washer, wherein said annular groove includes a bottom positioned between two annular concentric lips or beads of said lower face of said sealing washer.

11. The attachment fastener of claim 10, wherein said peripheral edge of said groove is defined by a wall in the form of a truncated cone.

12. The attachment fastener of claim 11, wherein said wall includes an annular bead having a rounded surface.

13. The attachment fastener of claim 10, wherein said sealing washer includes an external peripheral edge defining positional blocking notches for said collar.

14. The attachment fastener of claim 10, wherein said sealing washer includes a lower face extending substantially in a plane perpendicular to said axial direction.

15. The attachment fastener of claim 10, wherein said body, said collar, and said sealing washer are each circular in cross-section.

16. The attachment fastener of claim 10, wherein said body, said collar, and said sealing washer each have an oblong shape.

17. The attachment fastener of claim 10, wherein said body is made of a first plastic material, and said sealing washer is made of a second plastic material which is softer than said first plastic material.

18. The attachment fastener of claim 17, wherein said second plastic material is an elastomer.

* * * * *